(12) United States Patent
Jang

(10) Patent No.: US 11,734,544 B2
(45) Date of Patent: Aug. 22, 2023

(54) MOBILE PASSPORT, MOBILE PASSPORT GENERATION SYSTEM FOR GENERATING SAME, AND MOBILE PASSPORT CERTIFICATION METHOD

(71) Applicant: LORDSYSTEM CO., LTD., Seoul (KR)

(72) Inventor: Yang Ho Jang, Yeoncheon-gun (KR)

(73) Assignee: LORDSYSTEM CO., LTD., Seoul (KR)

( * ) Notice: Subject to any disclaimer, the term of this patent is extended or adjusted under 35 U.S.C. 154(b) by 339 days.

(21) Appl. No.: 16/981,254

(22) PCT Filed: Apr. 13, 2018

(86) PCT No.: PCT/KR2018/004322
§ 371 (c)(1),
(2) Date: Sep. 15, 2020

(87) PCT Pub. No.: WO2019/198849
PCT Pub. Date: Oct. 17, 2019

(65) Prior Publication Data
US 2021/0042600 A1    Feb. 11, 2021

(51) Int. Cl.
*G06K 5/00* (2006.01)
*G06K 19/10* (2006.01)
(Continued)

(52) U.S. Cl.
CPC ....... *G06K 19/10* (2013.01); *G06K 19/06028* (2013.01); *G06K 19/0727* (2013.01);
(Continued)

(58) Field of Classification Search
CPC ............. G06K 19/06; G06K 19/06028; G06K 19/0727; G06K 19/10; G06Q 40/123; G06Q 50/26; H04L 9/06; H04L 9/3236
See application file for complete search history.

(56) References Cited

U.S. PATENT DOCUMENTS

| | | | |
|---|---|---|---|
| 2008/0052527 A1* | 2/2008 | Siedlarz ................. | G06F 21/32 |
| | | | 713/186 |
| 2011/0138191 A1* | 6/2011 | Bond ...................... | G06F 21/32 |
| | | | 713/189 |

(Continued)

FOREIGN PATENT DOCUMENTS

| | | |
|---|---|---|
| JP | 2006215972 A | 8/2006 |
| JP | 2011150683 A | 8/2011 |

(Continued)

OTHER PUBLICATIONS

"An intelligent Ticket Checker Application for Train using OR Code" International Journal of Computer Applications, Smita Patil et al., 2016.

*Primary Examiner* — Thien M Le
(74) *Attorney, Agent, or Firm* — Maschoff Brennan

(57) ABSTRACT

A mobile passport, mobile passport generation system for generating same, and mobile passport certification method enable increased convenience for certifying passports. The passport is generated by digitalizing passport information written in an actual passport, thereby eliminating the risk of losing the passport, and with which the certification of a passport for a foreign tourist is carried out by scanning or inputting the digitalized passport information. A mobile passport, which includes a QR code including passport information, a photo writing unit, a country writing unit, and a manual certification number, is generated by using a mobile passport generation system which includes a mobile passport generation unit, a password generation unit, a mobile passport management server, and a terminal. The identity of a passport holder can be checked by checking the QR code, the manual certification number, a coupon number, and a tax return transaction number associated with the generated mobile passport.

12 Claims, 11 Drawing Sheets

(51) Int. Cl.
 *G06Q 40/12* (2023.01)
 *G06K 19/06* (2006.01)
 *G06K 19/07* (2006.01)
 *G06Q 50/26* (2012.01)
 *H04L 9/32* (2006.01)

(52) U.S. Cl.
 CPC ........... *G06Q 40/123* (2013.12); *G06Q 50/26* (2013.01); *H04L 9/3236* (2013.01)

(56) References Cited

U.S. PATENT DOCUMENTS

| | | | | |
|---|---|---|---|---|
| 2012/0125997 | A1* | 5/2012 | Burra | G06K 19/10 235/494 |
| 2013/0041742 | A1 | 2/2013 | Zhang et al. | |
| 2013/0080810 | A1* | 3/2013 | Wuidart | G06K 19/0712 713/322 |
| 2013/0201000 | A1* | 8/2013 | Solomon | G07C 9/29 340/5.83 |
| 2013/0243266 | A1* | 9/2013 | Lazzouni | G06V 40/10 382/115 |
| 2013/0341394 | A1* | 12/2013 | Seo | G07C 9/253 235/492 |
| 2015/0088778 | A1* | 3/2015 | Tsao | H04L 9/3226 705/325 |
| 2015/0356306 | A1 | 12/2015 | Carter | |
| 2017/0085691 | A1* | 3/2017 | Kim | H04M 1/2757 |
| 2017/0364889 | A1* | 12/2017 | Rastogi | G06Q 30/06 |
| 2022/0371355 | A1* | 11/2022 | Eichenberger | G02B 6/0035 |

FOREIGN PATENT DOCUMENTS

| | | |
|---|---|---|
| JP | 2012-114907 A | 6/2012 |
| KR | 10-2004-0086060 A | 10/2004 |
| KR | 10-2009-0110660 A | 10/2009 |
| KR | 20090110660 A | 10/2009 |
| KR | 10-1096175 B1 | 12/2011 |
| KR | 10-2014-0126976 A | 11/2014 |
| KR | 20140126976 A | 11/2014 |
| KR | 10-2018-0042788 A | 4/2018 |

* cited by examiner

MOBILE PASSPORT, MOBILE PASSPORT GENERATION SYSTEM FOR GENERATING SAME, AND MOBILE PASSPORT CERTIFICATION METHOD

TECHNICAL FIELD

The present invention relates to a mobile passport, a mobile passport generation system for generating the same, and a mobile passport certification method, and more particularly, to a mobile passport, a mobile passport generation system for generating the same, and a mobile passport certification method, in which a mobile passport is generated by electronically converting passport information written in an original passport to remove the risk of losing the original passport, and a passport of a foreign tourist is easily certified only by a simple scan or input to increase the convenience of purchase and tax refund.

BACKGROUND ART

Recently, the number of overseas travelers has been increased rapidly due to the progress of globalization such as active international exchanges and general overseas travels.

In general, in the case of leaving a country for tour or business purpose, a predetermined inquiry procedure is required during immigration for departure or arrival through an airport of the corresponding country after a passport is issued with a permission for the departure or arrival.

Passport information about a passport holder, which includes passport number, nationality, name, date of birth, sex, passport expiration date, citizenship number, and passport photo, is written in the passport.

Accordingly, the passport is required to be inquired after presented to airport staff upon the departure from or arrival to a country through the airport, and the staff inquiring the passport is required to manually check the details about the passport holder on the passport, and directly check the passport by comparing a photo on the passport with a face of the passport holder by using naked eyes. Thus, people arriving/departing through the airport are required to spend a lot of time for inquiring passports. In the worst case, the inconvenience are increased when it takes 1 to 2 hours for the passport inquiry.

Meanwhile, a place for selling duty-free goods to foreign tourists is classified into a city duty-free store and a post duty-free store. In the post duty-free store, a scheme for tax refund is divided into a pre-tax refund and a post-tax refund.

The pre-tax refund refers to a settlement scheme of immediately deducting a tax upon purchasing goods at a post duty-free store in the same way as the city duty-free stores.

A tourist is required to carry an original passport for the pre-tax refund and present the original passport to a store clerk, and the store clerk can carry out the pre-tax refund only after checking passport information by reading the passport through a passport recognition device or the like.

As described in the above manner, the tourist may go through the inconvenient process of presenting the original passport and allowing the original passport to be recognized for the tax refund, and the passport may be lost during stay in a foreign country.

In the above situation, travelers cannot prove their identities and are required to visit the homeland consulate or embassy to reissue the passport. For similar example, an electronic passport including a chip has been developed in which information on an original passport is stored into one chip as disclosed in Korean Unexamined Patent Publication No. 10-2016-0032002 (Patent Document 0001). In addition, there are various systems and methods for reading and authenticating an electronic passport chip as disclosed in Korean Patent Registration No. 10-1205905 (Patent Document 0002).

Since the above passport including the electronic chip is the original passport required to be carried by the tourist and still subject to the risk of loss, there are a lot of difficulties upon request for checking the identity of the passport holder for a tax refund or the like.

DISCLOSURE

Technical Problem

The present invention is disclosed to solve the above-mentioned problems, and an object of the present invention is to provide a mobile passport, a mobile passport generation system for generating the same, and a mobile passport certification method, in which passport information is digitized and stored in a smart phone or terminal so as to be used anywhere required to certify the passport for tax refund transactions, purchases, or the like.

In addition, an object of the present invention is to provide a mobile passport, a mobile passport generation system for generating the same, and a mobile passport certification method, in which a manual certification number and a coupon number are assigned to a certified passport number, thereby enabling an affiliated store to easily certify the identity of a foreign buyer.

Further, an object of the present invention is to provide a mobile passport, a mobile passport generation system for generating the same, and a mobile passport certification method, in which the user certification of a foreign purchaser is easily performed even without an original passport, by associating the mobile passport with a tax refund transaction number on a tax refund receipt processed with a pre-tax refund.

In addition, an object of the present invention is to provide a mobile passport, a mobile passport generation system for generating the same, and a mobile passport certification method, in which, when a payment is requested due to the purchase of goods by a mobile passport holder, a modification code is provided to allow a user to input a password according to settings, thereby dually performing the user certification process.

Technical Solution

In order to achieve the above-mentioned objects, according to the mobile passport, the mobile passport generation system for generating the same, and the mobile passport certification method of the present invention, at least one passport information among passport number, nationality, name, date of birth, sex, passport expiration date, citizenship number, and passport photo is recognized and extracted from an original passport, and the information is encrypted and recombined via the mobile passport generation system, thereby gene rating the mobile passport.

The mobile passport includes: a QR code generated by AES128-CBC encrypting HASH values of the passport number, name, date of birth, country, and passport photo; a photo indication portion for indicating an extracted passport photo; a country indication portion for indicating an extracted country by using a text or an image; and a manual certification code portion for indicating a manual certification number generated in response to an extracted passport number.

The mobile passport may be converted and displayed in a display window of a smart phone or used after printed as the QR code, in which a corresponding coupon number may be issued and stored therein.

The above mobile passport may be generated through the mobile passport generation system.

The Mobile passport generation system has a mobile passport information generation unit including a passport certification unit that recognizes an original passport through a camera and checks whether extracted passport information corresponds to a passport number in a normal state by using a network communication with a government office, a mobile passport manual certification unit that generates a manual certification number corresponding to the passport number among the passport information, and a coupon issuance management unit that generates a coupon number corresponding to the passport number among the passport information.

In addition, the Mobile passport generation system has an encryption generation unit configured to include a text encryption module that encrypts text information, the manual certification number, and the coupon number among the passport information extracted through the mobile passport information generation unit, and an image encryption module that encrypts image information including the photo among the passport information extracted through the mobile passport information generation unit, and combine the information of the text encryption module and the image encryption module to convert selected information into a QR code.

In addition, the Mobile passport generation system has a mobile passport management server that includes a text information DB and an image information DB and stores information generated by the encryption generation unit, and has a terminal that stores the QR code and the image information that are encrypted by the encryption generation unit and transmitted through a network Meanwhile, in the method of authenticating a mobile passport holder carrying the mobile passport generated through the mobile passport generation system, the mobile passport is certified by confirming the associated passport information using the QR code, manual certification number, coupon number, and tax refund transaction number.

Advantageous Effects

Thus, according to the mobile passport, the mobile passport generation system for generating the same, and the mobile passport certification method of the present invention, first, an original passport is photographed using a camera to easily extract passport information, so that the mobile passport can be easily generated.

Second, an original passport is not required to be carried to remove the risk of loss and it is possible to certify the identity of a passport holder by only the mobile passport, so that the user certification can be easily performed at any place required to certify a passport for tax refund or the like.

Third, a falsification-prevented or forgery-prevented mobile passport is used instead of a conventional original passport formed of paper or synthetic resin, so that the reliability on a passport can be increased.

Fourth, the mobile passport can be reissued at any time through the mobile passport management server, and the identity can be certified through the manual certification number and the coupon number associated when the mobile passport is generated.

Fifth, in the case that a foreign tourist receives a pre-tax refund for purchasing goods, a mobile passport having been certified previously is associated with a tax refund transaction number on a tax refund receipt for tax refund, so that the identity can be certified by using only the tax refund transaction number.

Sixth, when a payment is requested due to a purchase of goods by a mobile passport holder, a modification code is provided according to settings such that a password can be dually inputted, thereby enabling the accurate user certification.

BEST MODE

Figure 1:
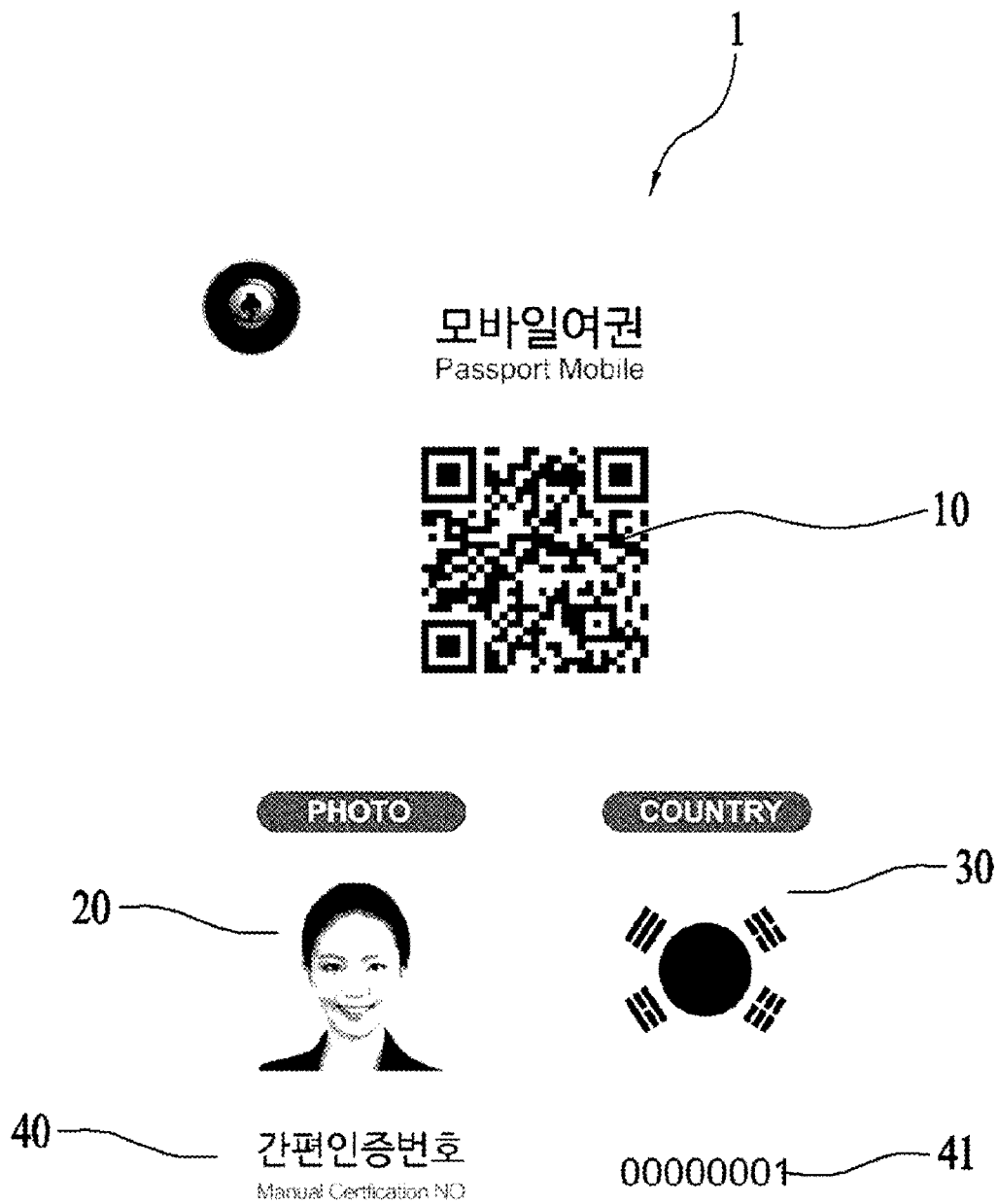
FIG. 1 is a schematic diagram showing a mobile passport according to one embodiment of the present invention.

The present invention, as a best mode, provides a mobile passport including: a QR code 10 generated by recognizing and extracting at least one passport information among passport number, nationality, name, date of birth, sex, passport expiration date, citizenship number, and passport photo from an original passport, and encrypting and recombining the information via the mobile passport generation system, in which HASH values of the passport number, name, date of birth, country, and passport photo are encrypted;

a photo indication portion 20 for indicating the extracted passport photo; a country indication portion 30 for indicating the extracted country by using a text or an image; and a manual certification code portion 40 for indicating a manual certification number 41 generated in response to the extracted passport number, wherein the identity can be verified using only a digitized code without an original passport.

Mode for Invention

Hereinafter, exemplary embodiments of the mobile passport, the mobile passport generation system for generating the same, and the mobile passport certification method according to the present invention will be described in detail with reference to the accompanying drawings.

In the following description of the embodiments of the present invention, the detailed description of relevant known functions or configurations will be omitted not to make the subject matter of the present invention unclear.

First, the present invention provides a mobile passport, a mobile passport generation system for generating the same, and a mobile passport certification method, in which passport information is electronically processed and stored in a smart phone, terminal, or the like so as to be used at any place required to certify a passport for tax refund or the like.

Referring to FIG. 1, a mobile passport 1 according to the present invention is displayed on a terminal of a passport holder carrying the mobile passport 1 or on a terminal of an affiliated store requesting a passport certification of the customer, after an original passport is photographed through a camera, information about the original passport is extracted, and the information is converted into a QR code or the image information is encrypted.

According to the mobile passport 1, at least one passport information among passport number, nationality, name, date of birth, sex, passport expiration date, citizenship number, and passport photo is recognized and extracted from an original passport, and the information is encrypted and recombined via the mobile passport generation system.

Specifically, the mobile passport 1 includes: a QR code 10 generated by AES128-CBC encrypting HASH values of the passport number, name, date of birth, country, and passport photo; a photo indication portion 20 for indicating the extracted passport photo; a country indication portion 30 for indicating the extracted country by using a text or an image; and a manual certification code portion 40 for indicating a manual certification number 41 generated in response to the extracted passport number, wherein the identity can be verified using only a digitized code without the original passport.

The mobile passport 1 may be converted and displayed in a display window of a terminal such as a smart phone or used after printed as the QR code.

For example, the mobile passport may be printed on a paper sticker and carried, or printed as a wristband type and carried, and the identity of the holder may be verified simply by scanning and reading the QR code.

In addition, when the mobile passport 1 is generated, a corresponding coupon number is issued together and included and stored in the information.

The issued coupon number may be used when the passport holder purchases goods.

Preferably, the mobile passport 1 may be generated through a mobile passport generation system 100 described later, and certified when the mobile passport is generated through an organization that can check the validity of passport information.

Figure 2:
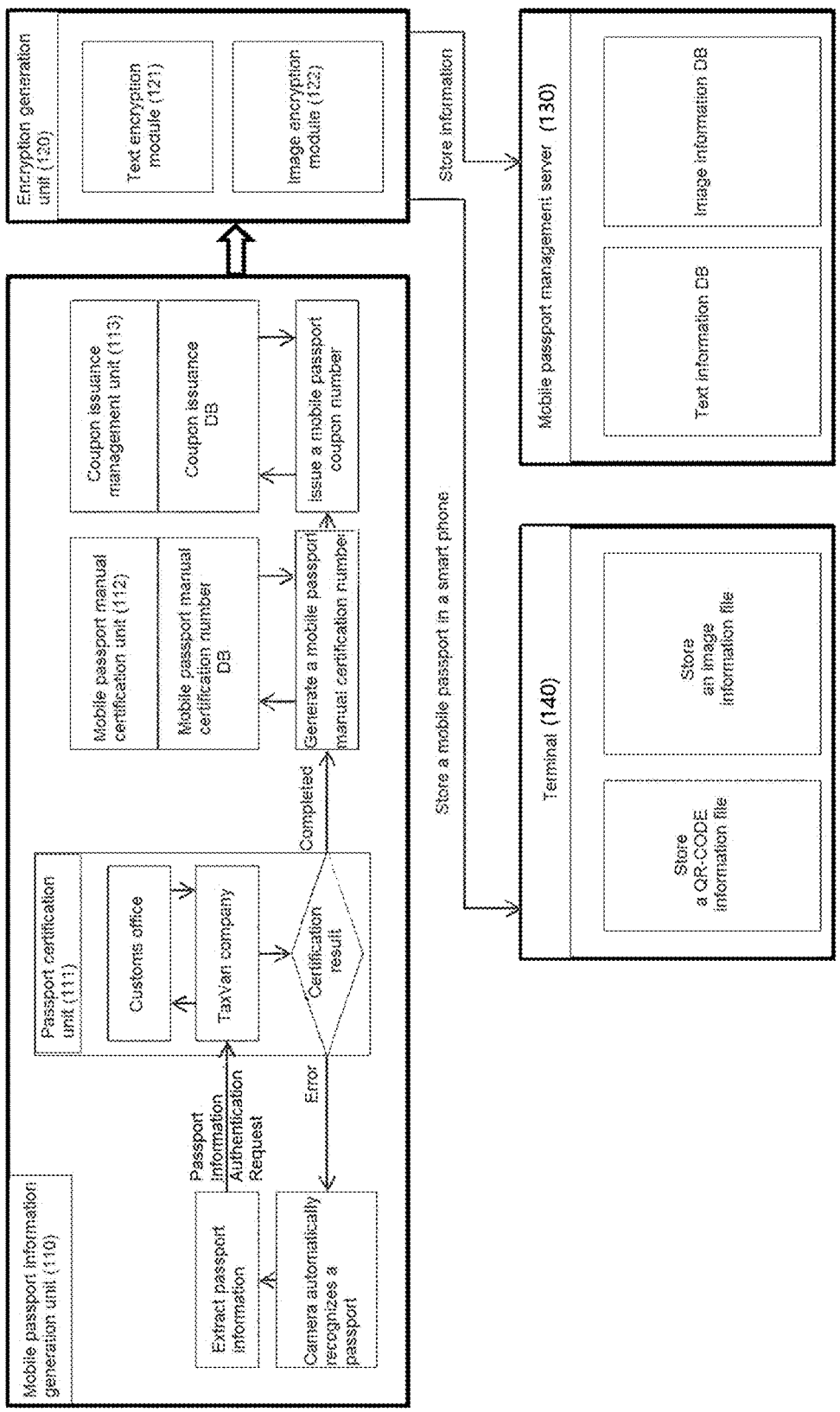
FIG. 2 is a block diagram showing a mobile passport generation system for generating a mobile passport according to the present invention.

Meanwhile, the mobile passport generation system 100 will be described in detail as follows with reference to FIGS. 2 and 3.

The mobile passport generation system 100 is a system for generating the above-described mobile passport 1, and includes a mobile passport information generation unit 110, an encryption generation unit 120, a mobile passport management server 130, and a terminal 140.

The mobile passport information generation unit 110 includes a passport certification unit 111 that recognizes an original passport through a camera and checks whether the extracted passport information corresponds to a passport number in a normal state by using a network communication with a government office, a mobile passport manual certification unit 112 that generates a manual certification number corresponding to the passport number among the passport information, and a coupon issuance management unit 113 that generates a coupon number corresponding to the passport number among the passport information.

In addition, the encryption generation unit 120 includes a text encryption module 121 that encrypts text information, the manual certification number, and the coupon number among the passport information extracted through the mobile passport information generation unit 110, and an image encryption module 122 that encrypts image information including the photo among the passport information extracted through the mobile passport information generation unit, in which the encryption generation unit combines the information of the text encryption module and the image encryption module to convert selected information into a QR code.

In addition, the mobile passport management server 130 includes a text information DB and an image information DB and stores information generated by the encryption generation unit 120. When certification of the mobile passport 1 is requested later, the stored information and the requested information are compared with each other and verified, and the stored information, upon a valid request, is transmitted to be displayed on a terminal of the passport holder or a terminal of an affiliated store requesting a passport inquiry.

Meanwhile, the terminal stores the QR code and the image information that are encrypted by the encryption generation unit 120 and transmitted through a network.

Figure 4:
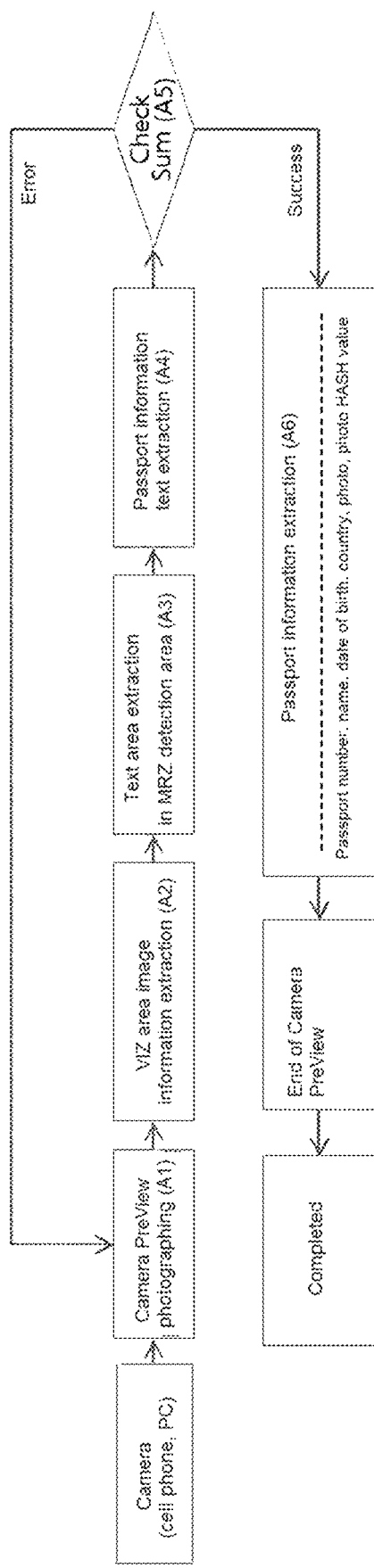
FIG. 4 is a diagram showing a flow for extracting passport information from an original passport in the mobile passport generation system according to FIG. 2.

In addition, the process of photographing and recognizing an original passport is as follows with reference to FIG. 4.

First, in the process, at least one passport information among passport number, nationality, name, date of birth, sex, passport expiration date, citizenship number, and passport photo is recognized and extracted from an original passport, and a process A1 of photographing an original passport using a camera is included.

In addition, a process A2 is included in which image information is extracted by detecting and encrypting a photo image in a visual inspection zone (VIZ) of the original passport, and assigning a photo HASH value, in the process A1.

In addition, a process A3 is included in which a text area is extracted from a machine readable zone (MRZ) of the original passport, in the process A1. A process A4 is included in which text information including passport holder's name, passport number, nationality, date of birth, sex, passport expiration date, and citizenship number is extracted from the extracted information, in the process A3.

In addition, a process A5 is included in which the text information extracted in the process A4 is compared and confirmed with the content photographed in the process A1. When there is an error in the process A5, the process A1 is performed again and when there is no error in the process A5, a process A6 is included in which the extracted image information and text information are stored.

Through the above processes, the passport information on the original passport is extracted and stored in the form of image information and text information.

Figure 5:
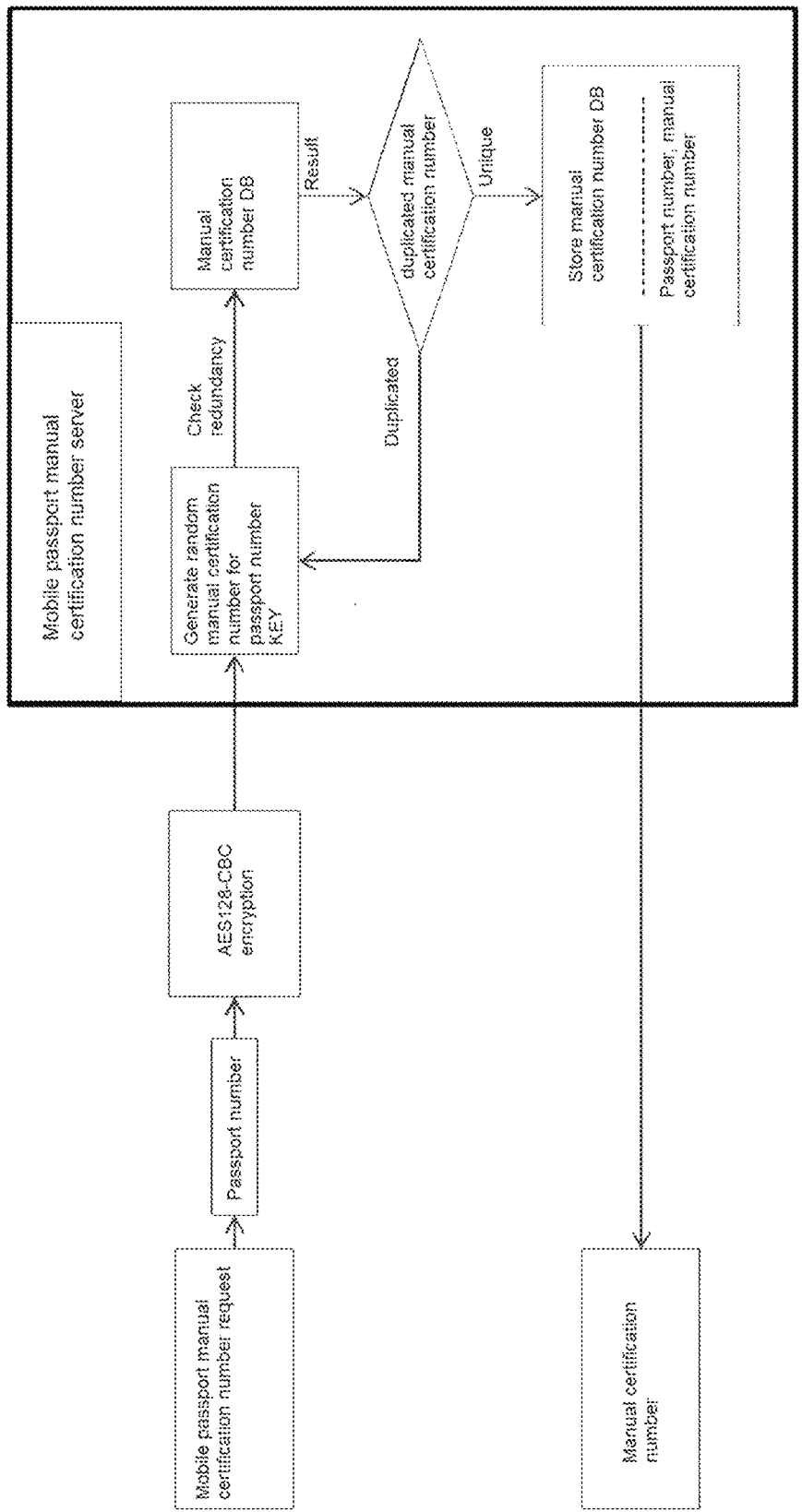
FIG. 5 is a diagram showing the generation of a manual certification number of the mobile passport in the mobile passport generation system according to FIG. 2.

Meanwhile, referring to FIG. 5, when the mobile passport 1 according to the present invention is generated, the identity may be easily certified only by entering an assigned manual certification number 41 without scanning the QR code.

Figure 3:
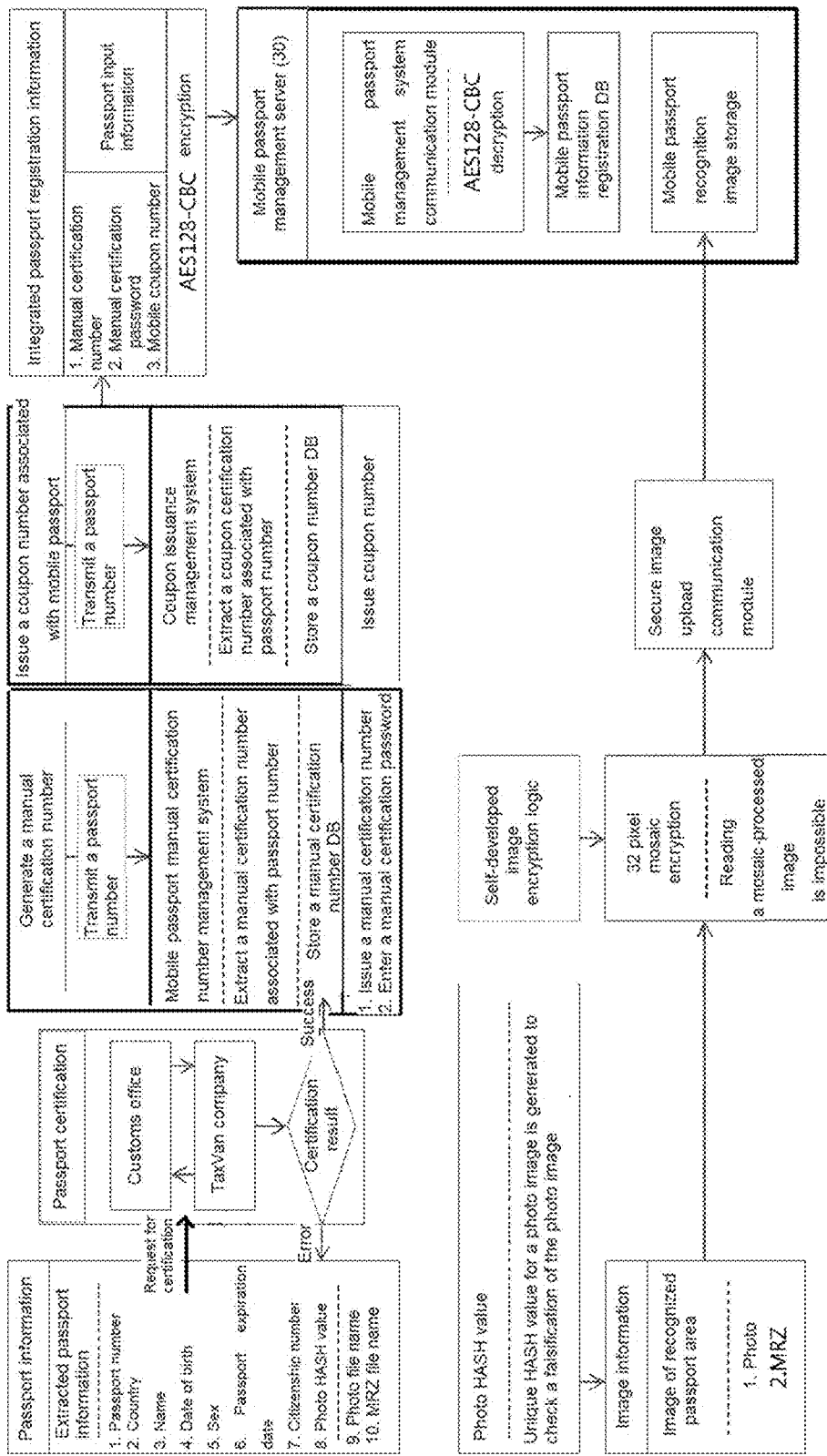
FIG. 3 is a diagram showing a passport information encryption and a server registration of the mobile passport generation system according to FIG. 2.

Referring to FIG. 3 together, the mobile passport manual certification unit 112 of the mobile passport information generation unit 110 for generating the manual certification number 41 includes a manual certification number server including a manual certification number DB.

In addition, the mobile passport manual certification unit 112 generates single manual certification numbers corresponding to passport numbers, through processes including: a process B1 of receiving the encrypted passport number and generating a random type manual certification number corresponding to an encrypted passport number key; a process B2 of comparing the random type manual certification number with the manual certification number DB to determine whether to duplicate; and a process B3 of storing the manual certification number processed in the process B2 together with the corresponding passport number in the manual certification number DB, and confirming and activating the stored manual certification number.

The above manual certification number 41 is written on one side of the mobile passport 1, and the mobile passport holder may obtain the certification by using only the manual certification number 41.

Figure 6:
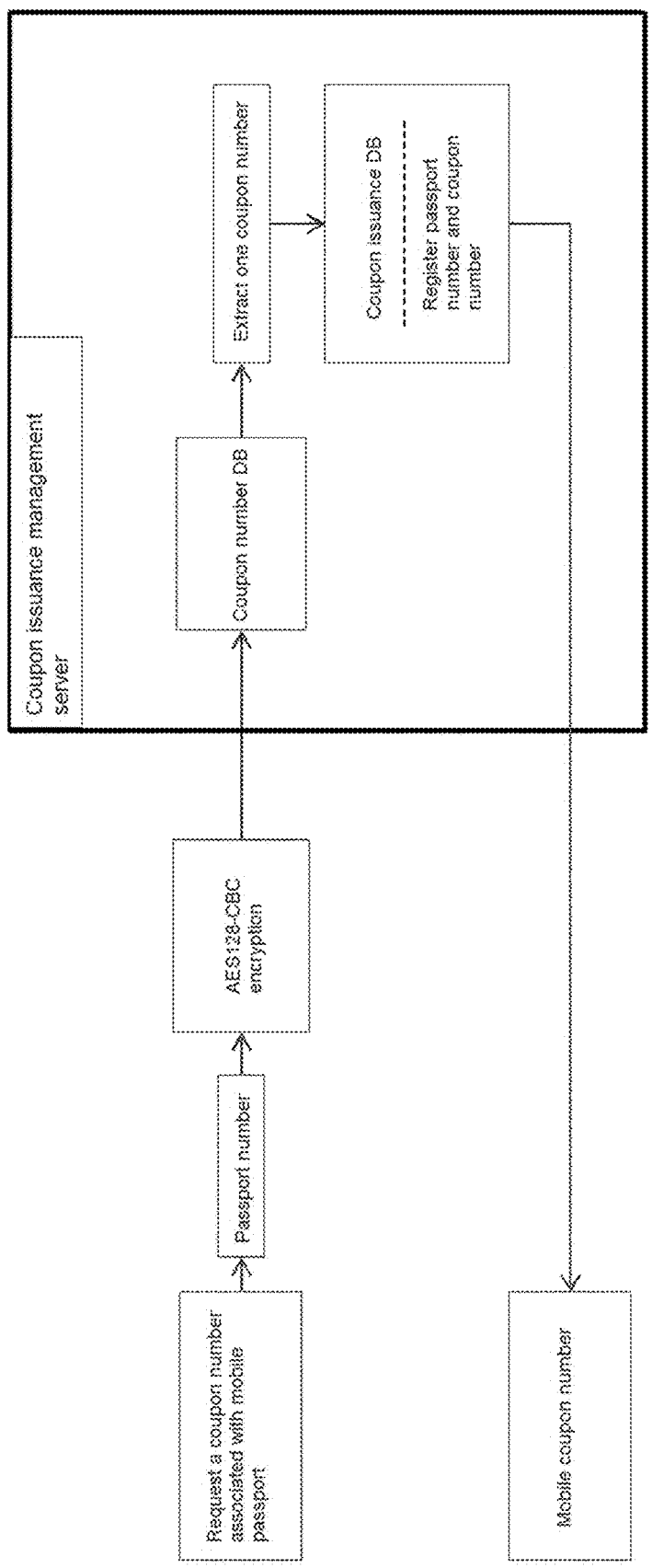
FIG. 6 is a diagram showing a coupon issuance associated with the mobile passport in the mobile passport generation system according to FIG. 2.

Meanwhile, referring to FIG. 6, when the mobile passport 1 according to the present invention is generated, the identity may be easily certified by simply checking the coupon number issued corresponding to the passport number, without scanning the QR code.

Referring to FIG. 3 together, the coupon issuance management unit 113 of the mobile passport information generation unit 110 includes: a coupon issuance management server including a coupon number DB.

In addition, the coupon issuance management unit 113 generates single mobile coupon numbers corresponding to passport numbers, through the processes including: a process C1 of receiving the encrypted passport number and selecting one coupon number from the coupon number DB; and a process C2 of storing the coupon number selected in the process C1 together with the passport number in the coupon number DB, and confirming and activating the stored coupon number.

As described above, the mobile passport 1 including the manual certification number and the coupon number allows the user certification to be easily performed without carrying the original passport. The certification method using the above-mentioned mobile passport will be described as follows.

The mobile passport 1 is certified by confirming associated passport information using a QR code, a manual certification number, a coupon number, and a tax refund transaction number.

Figure 7:
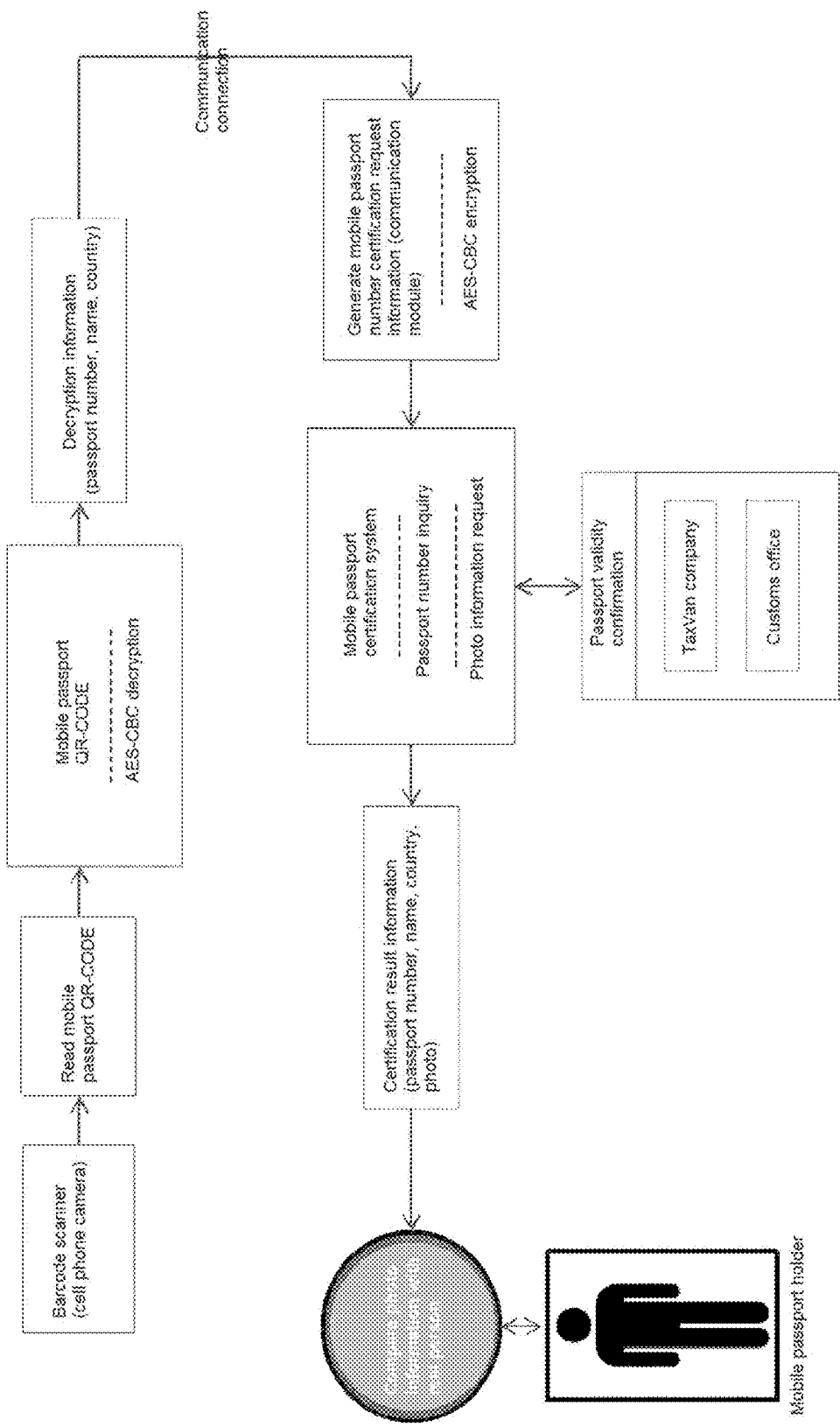
FIG. 7 is a flow chart showing a certification method when an affiliated store requests an inquiry using a QR code of the mobile passport according to the present invention.

First, the certification using the QR code of the mobile passport 1 will be described as follows with reference to FIG. 7.

The method of authenticating a mobile passport holder carrying the mobile passport generated through the mobile passport generation system includes:

a step D1 of scanning a QR code 10 of a mobile passport using a smartphone or a barcode scanner by an affiliated store requesting to certify the mobile passport; a step D2 of requesting a confirmation on information in the QR code scanned in the step D1 to the mobile passport management server 130 through network communication; a step D3 in which the mobile passport management server 130 communicates with a government office server through the network, inquires a passport number, and transmits, upon valid passport number, passport information corresponding to the passport number from the text information DB and the image information DB so as to expose the corresponding passport information on a display screen of the affiliated store; and a step D4 in which the affiliated store verifies the passport information transmitted in the step D3 and compares and verifies a passport photo on the image information with a face of the mobile passport holder.

Figure 8:
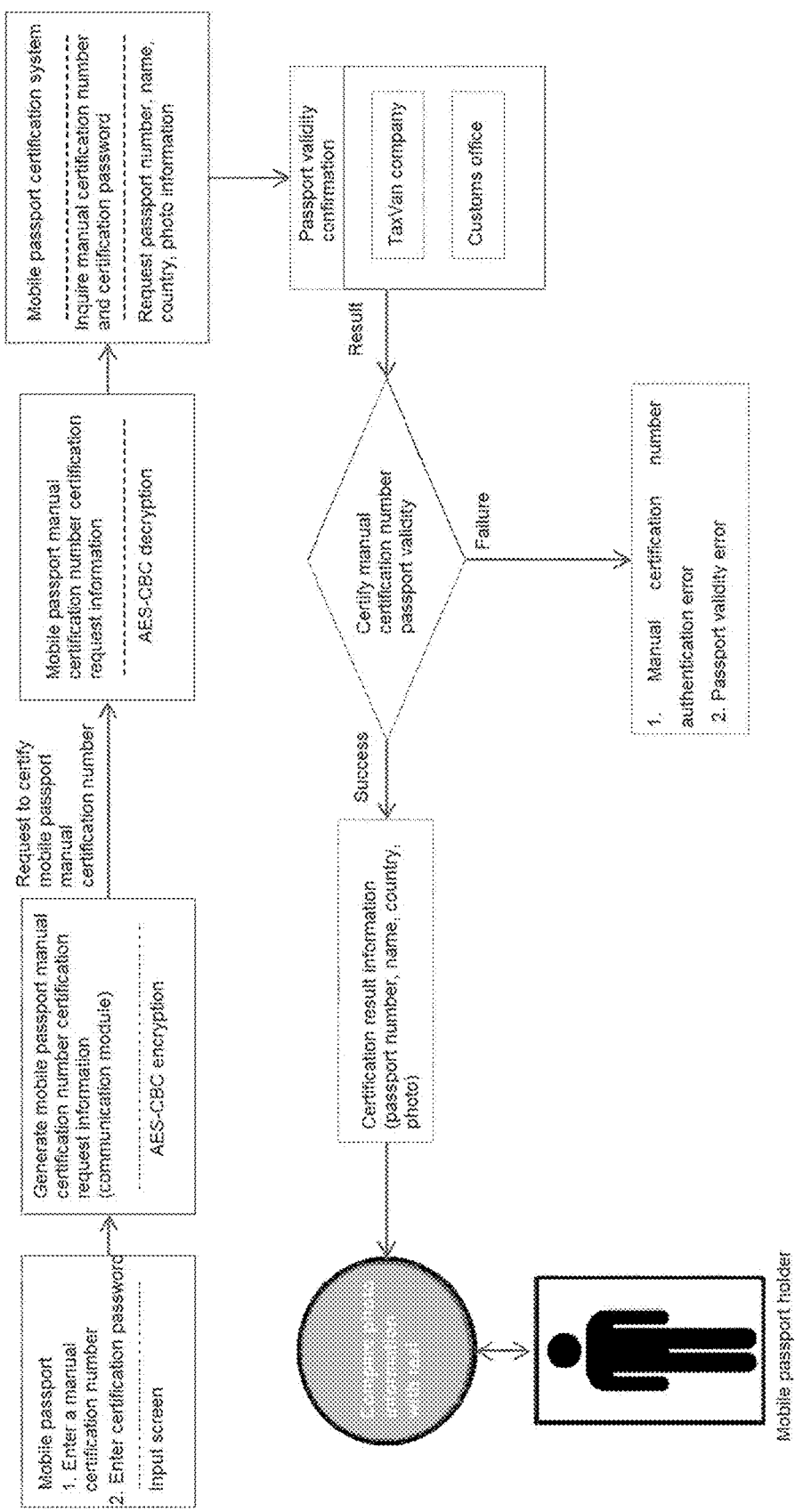
FIG. 8 is a flow chart showing a certification method when an affiliated store requests an inquiry using a manual certification number of the mobile passport according to the present invention.

Then, the certification using the manual certification number of the mobile passport 1 will be described as follows with reference to FIG. 8.

The method of authenticating a mobile passport holder carrying the mobile passport generated through the mobile passport generation system includes:

a step E1 in which the affiliated store requesting to certify the mobile passport inputs the manual certification number 41 and a certification password of the mobile passport holder; a step E2 of requesting the manual certification number inputted in the step E1 to the mobile passport management server 130 through the network communication to verify the manual certification number; a step E3 in which the mobile passport management server 130 checks the requested manual certification number 41 and the certification password, and communicates with a government office server through a network upon correspondence with the manual certification number and the certification password to apply an inquiry of the passport number among the passport information corresponding to the manual certification number; a step E4 of verifying a validity of the passport number through the government office server in the step E3, and transmitting a manual certification number certification error and a passport validity error to the affiliated store when the passport number is not valid; a step E5 in which the mobile passport management server transmits the passport information corresponding to the manual certification number in the text information DB and the image information DB so as to be exposed on the display screen of the affiliated store, when the passport number in the step E3 is a valid passport number through the government office server; and a step E6 in which the affiliated store verifies the passport information transmitted in the step E5 and compares and verifies a passport photo on the image information with a face of the mobile passport holder.

Figure 9:
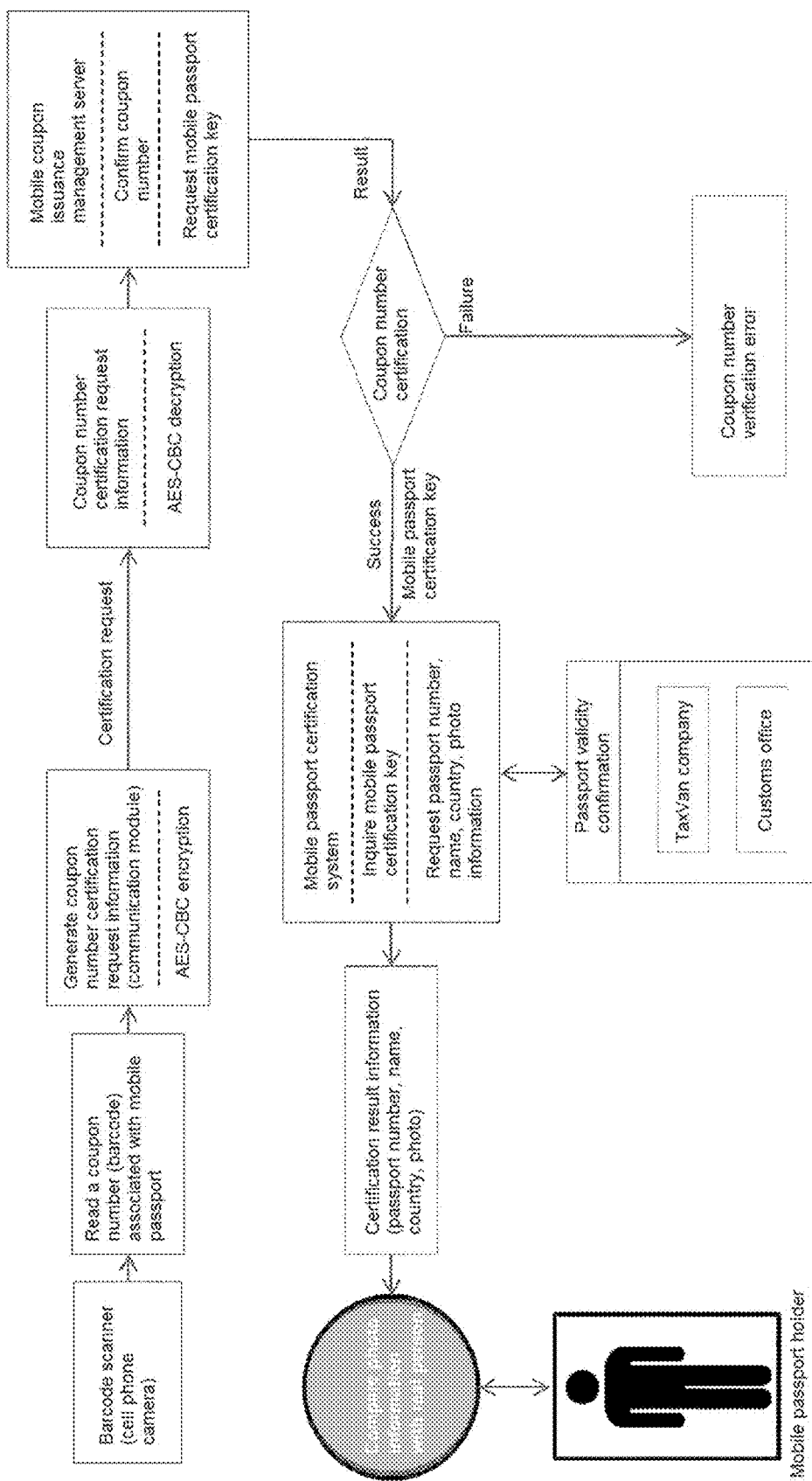
FIG. 9 is a flow chart showing a certification method when an affiliated store requests an inquiry using a coupon number associated with the mobile passport according to the present invention.

In addition, the certification using the coupon number issued when the mobile passport 1 is generated will be described as follows with reference to FIG. 9.

The method of authenticating a mobile passport holder carrying the mobile passport generated through the mobile passport generation system includes:

a step F1 of scanning a coupon number associated with a mobile passport of a mobile passport holder; a step F2 of requesting to compare and confirm the coupon number scanned in the step F1 through network communication with the coupon number DB of the mobile coupon issuance management unit 112; a step F3 of confirming a validity of the coupon number in the step F2 and requesting a certification key of the mobile passport associated with the coupon number to the mobile passport management server 130; a step F4 of transmitting a coupon number certification error to the affiliated store when the coupon number requested in the step F2 is invalid; a step F5 in which the mobile passport management server 130 inquires the requested certification key, inquires whether the mobile passport is a valid to be associated with a coupon, requests an inquiry on a passport number among the corresponding passport information to the government office server through network communication, and transmits, upon valid passport number, the passport information corresponding to the passport number in the text information DB and the image information DB so as to be exposed on the display screen of the affiliated store; and a step F6 in which the affiliated store verifies the passport information transmitted in the step F5 and compares and verifies a passport photo on the image information with a face of the mobile passport holder.

Figure 10:
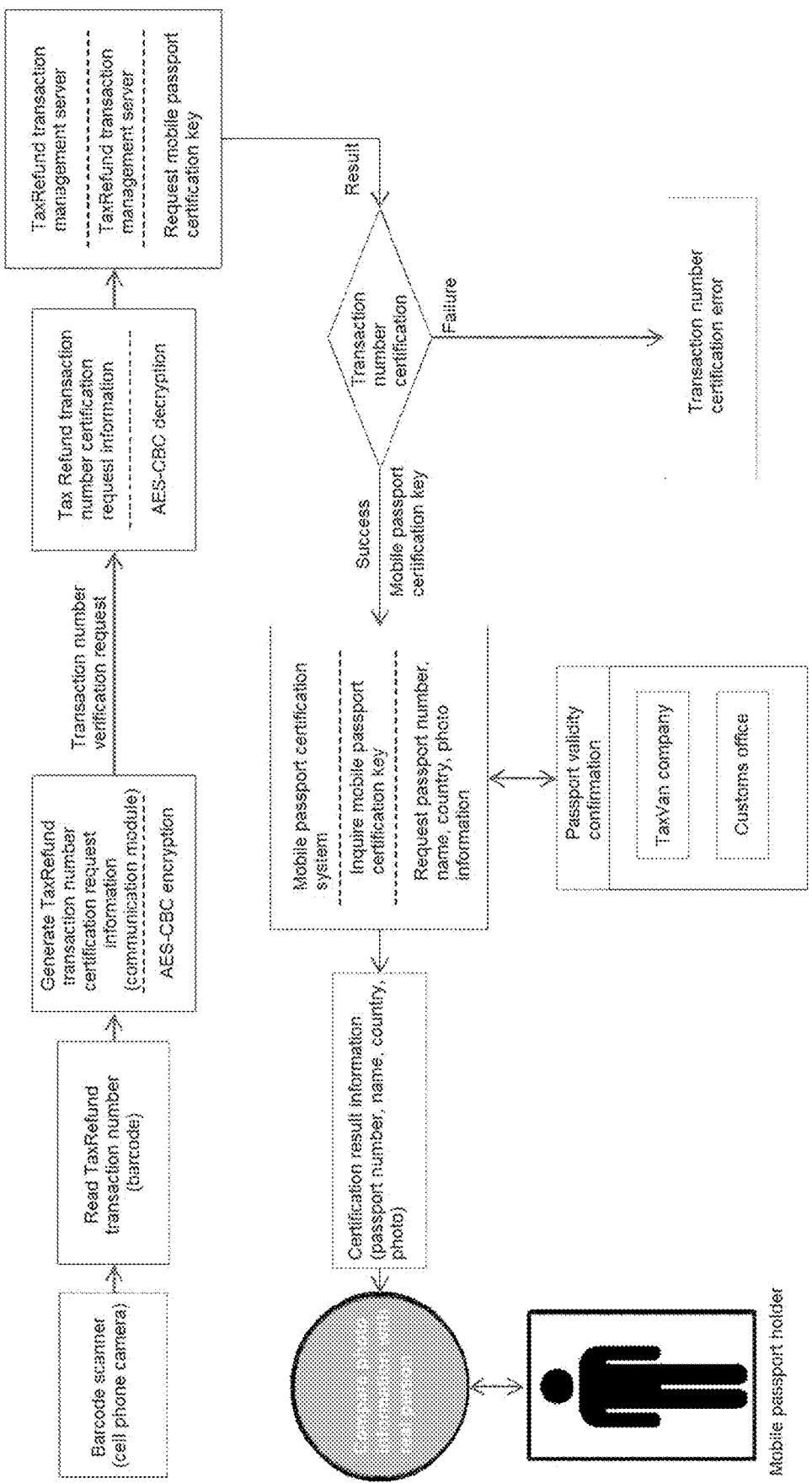
FIG. 10 is a flow chart showing a certification method when an affiliated store requests an inquiry using a tax refund transaction number associated with the mobile passport according to the present invention.

In addition, the certification using a tax refund transaction number included in a refund receipt upon purchase and pre-tax refund using the mobile passport 1 will be described as follows with reference to FIG. 10.

The method of authenticating a mobile passport holder carrying the mobile passport generated through the mobile passport generation system includes:

a step G1 of scanning a tax refund transaction number on the issued tax refund receipt by the affiliated store requesting to certify the mobile passport; a step G2 of encrypting and transmitting the tax refund transaction number scanned in the step G1 to a tax refund transaction management server including tax refund transaction information through network communication, and requesting to verify whether the scanned tax refund transaction number corresponds to a transaction number stored in the tax refund server; a step G3 of confirming a validity of the transaction number in the step G2 and requesting a certification key of the mobile passport associated with the transaction number to the mobile passport management server 130; a step G4 of transmitting a transaction number certification error to the affiliated store when the transaction number requested in the step G2 is invalid; a step G5 in which the mobile passport management server 130 inquires the requested certification key, inquires whether the mobile passport is valid to be associated with the transaction number, requests to inquire the passport number among the corresponding passport information to the government office server through network communication, and transmits, upon valid passport number, the passport information corresponding to the passport number in the text information DB and the image information DB so as to be exposed on the display screen of the affiliated store; and a step G6 in which the affiliated store verifies the passport information transmitted in the step G5 and compares and verifies a passport photo on the image information with a face of the mobile passport holder.

Meanwhile, the method further includes a step of transmitting the information on the passport number to the government office server when the passport number is invalid upon certification of the identity associated with the mobile passport 1 of the present invention, so as to prevent problems caused by criminal exposure or passport number theft.

When the mobile passport holder has any one information of the QR code, manual certification number, coupon number, or tax refund transaction number, the mobile passport holder may obtain the certification after the affiliated store checks the information and compares the passport information transmitted onto the display screen of the affiliated store with the real holder, through the above-described mobile passport certification method.

Meanwhile, the mobile passport holder may set the user certification process when the mobile passport is initially generated, such that the user certification process can be dually performed as a payment is conducted due to the purchase of goods.

Figure 11:
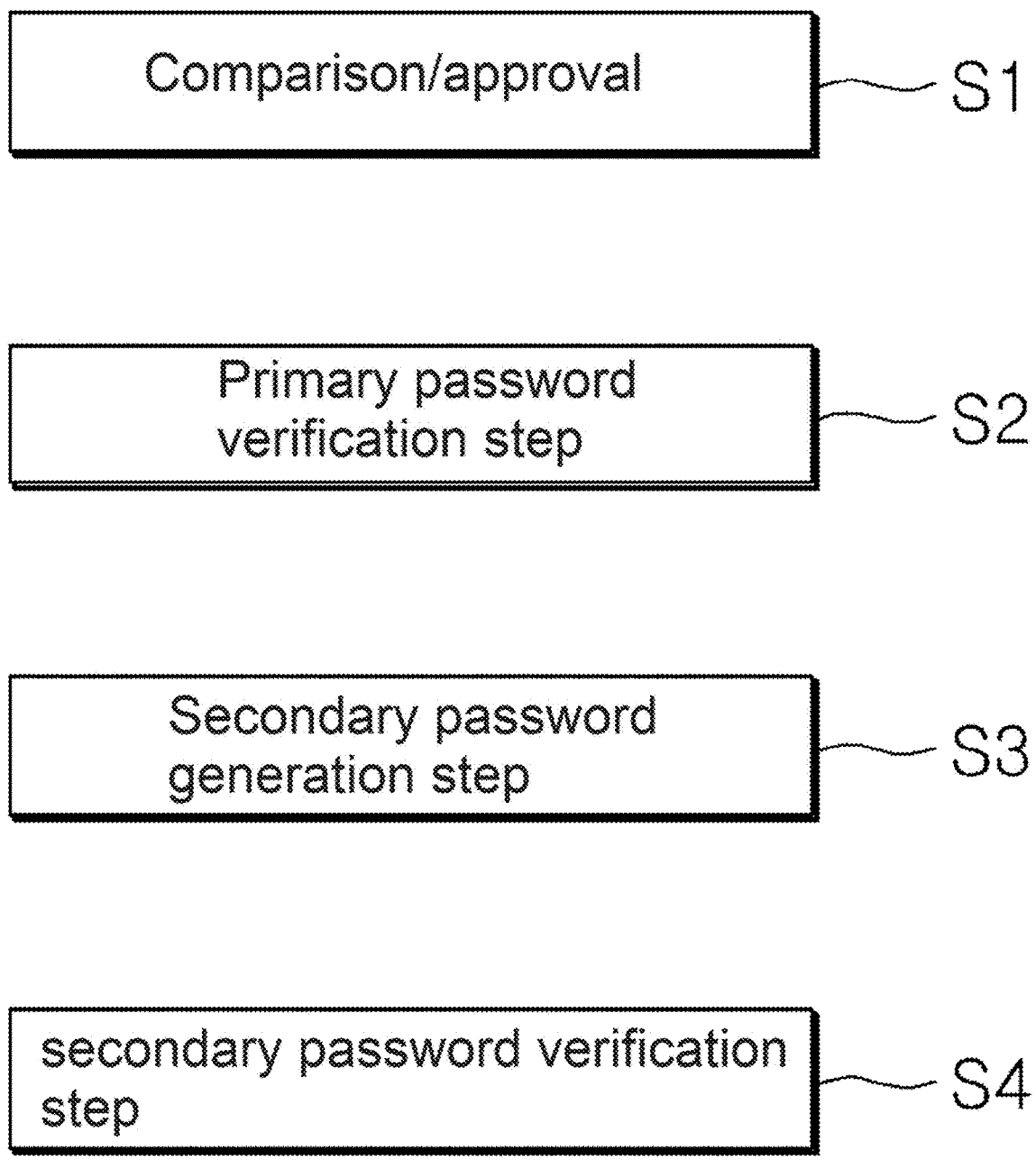
FIG. 11 is a flow chart showing a dual user-certification process when a mobile passport holder purchases goods using the mobile passport according to the present invention.

The dual user-certification may be set by a member who wants to have a mobile passport as needed when the mobile passport is generated initially. The mobile passport certification method of the mobile passport holder registered in the dual certification process will be described as follows with reference to FIG. 11.

First, the method further includes comparison/approval step S1 in which the affiliated store compares the passport photo on the image information transmitted through the mobile passport management server 130 with a real face of the mobile passport holder and approves that the mobile passport holder is confirmed, when the identity is verified, that is, the user certification is performed using the above QR code, manual certification number, coupon number, or tax refund transaction number.

The selection of the affiliated store may be checked by the selection of an affiliated store owner on the display screen of the affiliated store. In addition, a first password verification step S2 proceeds in which a password having already been set by the holder is inputted to verify the identity of the holder when a payment followed by the purchasing behavior of the mobile passport holder is requested.

The sameness of the password is checked in a terminal of the affiliated store, in which the mobile passport management server 130 confirms whether the mobile passport holder has consented to the user certification according to the reinforced dual certification procedure at the time of a purchase behavior and transmits the confirmation to the affiliated store. A second password generation step S3 of presenting a preset modification code proceeds in the case of the holder who has consented.

In other words, in secondary password generation step S3, a dual verification procedure is applied to the holder having passed primary password verification step S2, in which the preset modification code is a modification code applicable to a pattern system already known to the mobile passport holder.

Then, the mobile passport holder undergoes second password verification step S4 of modifying and inputting the primary password by applying the preset modification code. Thus, the user certification is finished.

Meanwhile, the modification code may be indicated by numbers or promised characters on the display. The number or promised character is required to be recognized in advance by the mobile passport holder such that the primary password inputted by the mobile passport holder is required to be converted into a secondary password through a pattern scheme set by the mobile passport holder, that is, a pattern scheme such as adding, subtracting, or position-changing the primary password.

In addition, the mobile passport holder confirms the preset modification code and enters the modified secondary password, thereby finishing the identity verification.

For example, the primary password may be 1234, and the modification code may be the number 3.

When it is assumed that the mobile passport holder sets a pattern as adding a corresponding number in the case that the modification code is a number, since the mobile passport holder has set the number 3 upon the consent on the dual certification procedure, and the mobile passport holder inputs 1237 as the secondary password in the secondary password verification step S4 in addition to the primary password, thereby finishing the user certification again.

The above configuration is merely one embodiment, and the above-described modification code and the pattern may be variously set.

Through the above dual user-certification procedure, the purchasing behavior of the mobile passport holder may be checked once again, and the affiliated store may check the mobile passport holder once again, so that the safe purchase behavior and identity verification may be facilitated.

In addition, when the mobile passport is lost, the user certification may be confirmed once again through the dual verification process with respect to a person having only the QR code or manual certification number.

It shall be apparent to those skilled in the art that the present invention is not limited to the described embodiments and accompanying drawings, and various replacements, deformations and modifications are available without departing from the spirit or scope of the invention as defined in the appended claims.

INDUSTRIAL APPLICABILITY

Description of Reference Numerals

The invention claimed is:

1. A mobile passport comprising:
a QR code generated by recognizing and extracting at least one passport information among passport number, nationality, name, date of birth, sex, passport expiration date, citizenship number, and passport photo from an original passport, and encrypting and recombining the information via a mobile passport generation system, in which HASH values of the passport number, name, date of birth, country, and passport photo are encrypted;
a photo indication portion for indicating the extracted passport photo;
a country indication portion for indicating the extracted country by using a text or an image; and
a manual certification code portion for indicating a manual certification number generated in response to the extracted passport number, wherein
an identity is verified using only a digitized code without the original passport, and
wherein the mobile passport generation system comprises:
a mobile passport information generation unit including a passport certification unit that recognizes an original passport through a camera and checks whether extracted passport information corresponds to a passport number in a normal state by using a network communication with a government office, a mobile passport manual certification unit that generates a manual certification number corresponding to a passport number among the passport information, and a coupon issuance management unit that generates a coupon number corresponding to the passport number among the passport information;
an encryption generation unit configured to include a text encryption module that encrypts text information, the manual certification number, and the coupon number among the passport information extracted through the mobile passport information generation unit, and an image encryption module that encrypts image information including the photo among the passport information extracted through the mobile passport information generation unit, and combine the information of the text encryption module and the image encryption module to convert selected information into a QR code;
a mobile passport management server including a text information DB and an image information DB and storing information generated by the encryption generation unit; and
a terminal that stores the QR code and the image information that are encrypted by the encryption generation unit and transmitted through a network.

2. The mobile passport of claim 1, wherein the mobile passport is converted and displayed in a display window of a smart phone or used after printed as the QR code, in which a corresponding coupon number is issued and stored therein.

3. A mobile passport generation system for generating a mobile passport, the mobile passport generation system comprising:
a mobile passport information generation unit including a passport certification unit that recognizes an original passport through a camera and checks whether extracted passport information corresponds to a passport number in a normal state by using a network communication with a government office, a mobile passport manual certification unit that generates a manual certification number corresponding to a passport number among the passport information, and a coupon issuance management unit that generates a coupon number corresponding to the passport number among the passport information;
an encryption generation unit configured to include a text encryption module that encrypts text information, the manual certification number, and the coupon number among the passport information extracted through the mobile passport information generation unit, and an image encryption module that encrypts image information including the photo among the passport information extracted through the mobile passport information generation unit, and combine the information of the text encryption module and the image encryption module to convert selected information into a QR code;
a mobile passport management server including a text information DB and an image information DB and storing information generated by the encryption generation unit; and
a terminal that stores the QR code and the image information that are encrypted by the encryption generation unit and transmitted through a network,
wherein the mobile passport comprises:
a QR code generated by recognizing and extracting at least one passport information among passport number, nationality, name, date of birth, sex, passport expiration date, citizenship number, and passport photo from an original passport, and encrypting and recombining the information via the mobile passport generation system, in which HASH values of the passport number, name, date of birth, country, and passport photo are encrypted;
a photo indication portion for indicating the extracted passport photo;
a country indication portion for indicating the extracted country by using a text or an image; and
a manual certification code portion for indicating a manual certification number generated in response to the extracted passport number,
wherein an identity is verified using only a digitized code without the original passport.

4. The mobile passport generation system of claim 3, wherein the passport information is extracted through:
- a process (A1) of photographing an original passport using a camera;
- a process (A2) of extracting image information by detecting and encrypting a photo image in a visual inspection zone of the original passport, and assigning a photo HASH value, in the process (A1);
- a process (A3) of extracting a text area from a machine readable zone of the original passport in the process (A1);
- a process (A4) of extracting text information including passport holder's name, passport number, nationality, date of birth, sex, passport expiration date, and citizenship number from the extracted information in the process (A3);
- a process (A5) of comparing the text information extracted in process A4 with the content photographed in the process (A1); and
- a process (A6) in which the process (A1) is performed again when there is an error in the process (A5), and the extracted image information and text information are stored when there is no error in the process (A5).

5. The mobile passport generation system of claim 3, wherein the mobile passport manual certification unit of the mobile passport information generation unit includes a manual certification number server including a manual certification number DB, and generates single manual certification numbers corresponding to passport numbers, respectively, through process including:
- a process (B1) of receiving the encrypted passport number and generating a random type manual certification number corresponding to an encrypted passport number key;
- a process (B2) of comparing the random type manual certification number with the manual certification number DB to determine whether to duplicate; and
- a process (B3) of storing the manual certification number processed in the process (B2) together with the corresponding passport number in the manual certification number DB, and confirming and activating the stored manual certification number.

6. The mobile passport generation system of claim 3, wherein the coupon issuance management unit of the mobile passport information generation unit includes a coupon issuance management server including a coupon number DB, and generates single mobile coupon numbers corresponding to passport numbers, respectively, through process including:
- a process (C1) of receiving the encrypted passport number and selecting one coupon number from the coupon number DB, and
- a process (C2) of storing the coupon number selected in the process (C1) together with the passport number in the coupon number DB, and confirming and activating the stored coupon number.

7. A method of certifying a mobile passport holder carrying a mobile passport generated through a mobile passport generation system according to claim 3, the method comprising:
- a step (D1) of scanning a QR code of a mobile passport using a smartphone or a barcode scanner by an affiliated store requesting to certify the mobile passport;
- a step (D2) of requesting a confirmation on information in the QR code scanned in the step D1 to the mobile passport management server through network communication;
- a step (D3) in which the mobile passport management server communicates with a government office server through the network, inquires a passport number, and transmits, upon valid passport number, passport information corresponding to the passport number from the text information DB and the image information DB so as to expose the corresponding passport information on a display screen of the affiliated store; and
- a step (D4) in which the affiliated store verifies the passport information transmitted in the step (D3) and compares and verifies a passport photo on the image information with a face of the mobile passport holder.

8. The method of claim 7, further comprising:
- a step of transmitting the information on the passport number to the government office server when the passport number is invalid.

9. The method of claim 7, further comprising:
- a comparison/approval step (Si) in which the affiliated store compares the passport photo on the image information transmitted through the mobile passport management server with the real face of the mobile passport holder and approves that the mobile passport holder is confirmed;
- a primary password verification step (S2) of inputting a password for the identity of the holder when a payment followed by the purchasing behavior of the mobile passport holder is requested;
- a secondary password generation step (S3) of determining whether the mobile passport holder is a holder having consented reinforced user certification upon a purchasing behavior, and presenting a preset modification code upon the holder having consented; and
- a second password verification step (S4) in which the mobile passport holder modifies and re-inputs the primary password by applying the preset modification code.

10. A method of certifying a mobile passport holder carrying a mobile passport generated through a mobile passport generation system according to claim 3, the method comprising:
- a step (E1) in which the affiliated store requesting to certify the mobile passport inputs the manual certification number and a certification password of the mobile passport holder;
- a step (E2) of requesting the manual certification number inputted in the step (E1) to the mobile passport management server through the network communication to verify the manual certification number;
- a step (E3) in which the mobile passport management server checks the requested manual certification number and the certification password, and communicates with a government office server through a network upon correspondence with the manual certification number and the certification password to apply an inquiry of the passport number among the passport information corresponding to the manual certification number;
- a step (E4) of verifying a validity of the passport number through the government office server in the step (E3), and transmitting a manual certification number certification error and a passport validity error to the affiliated store when the passport number is not valid;
- a step (E5) in which the mobile passport management server transmits the passport information corresponding to the manual certification number in the text information DB and the image information DB so as to be exposed on the display screen of the affiliated store, when the passport number in the step (E3) is a valid passport number through the government office server; and a step (E6) in which the affiliated store verifies the passport information transmitted in the step (E5) and compares and verifies a passport photo on the image information with a face of the mobile passport holder.

11. A method of certifying a mobile passport holder carrying a mobile passport generated through a mobile passport generation system according to claim 3, the method comprising:

a step (F1) of scanning a coupon number associated with a mobile passport of a mobile passport holder;

a step (F2) of requesting to compare and confirm the coupon number scanned in the step (F1) through network communication with the coupon number DB of the mobile coupon issuance management unit;

a step (F3) of confirming a validity of the coupon number in the step (F2) and requesting a certification key of the mobile passport associated with the coupon number to the mobile passport management server;

a step (F4) of transmitting a coupon number certification error to the affiliated store when the coupon number requested in the step (F2) is invalid;

a step (F5) in which the mobile passport management server inquires the requested certification key, inquires whether the mobile passport is valid to be associated with the coupon, requests to inquire the passport number among the corresponding passport information to the government office server through network communication, and transmits, upon valid passport number, the passport information corresponding to the passport number in the text information DB and the image information DB so as to be exposed on the display screen of the affiliated store; and a step (F6) in which the affiliated store verifies the passport information transmitted in the step (F5) and compares and verifies a passport photo on the image information with a face of the mobile passport holder.

12. A method of certifying a mobile passport holder carrying a mobile passport generated through a mobile passport generation system according to claim 3, the method comprising:

a step (G1) of scanning a tax refund transaction number on the issued tax refund receipt by the affiliated store requesting to certify the mobile passport;

a step (G2) of encrypting and transmitting the tax refund transaction number scanned in the step (G1) to a tax refund transaction management server including tax refund transaction information through network communication, and requesting to verify whether the scanned tax refund transaction number corresponds to a transaction number stored in the tax refund server;

a step (G3) of confirming a validity of the transaction number in the step (G2) and requesting a certification key of the mobile passport associated with the transaction number to the mobile passport management server;

a step (G4) of transmitting a transaction number certification error to the affiliated store when the transaction number requested in the step (G2) is invalid;

a step (G5) in which the mobile passport management server inquires the requested certification key, inquires whether the mobile passport is valid to be associated with the transaction number, requests to inquire the passport number among the corresponding passport information to the government office server through network communication, and transmits, upon valid passport number, the passport information corresponding to the passport number in the text information DB and the image information DB so as to be exposed on the display screen of the affiliated store; and a step (G6) in which the affiliated store verifies the passport information transmitted in the step (G5) and compares and verifies a passport photo on the image information with a face of the mobile passport holder.

* * * * *